Aug. 7, 1962     W. S. WOLFRAM     3,048,056
DRIVE SYSTEM
Filed April 10, 1958     3 Sheets-Sheet 1
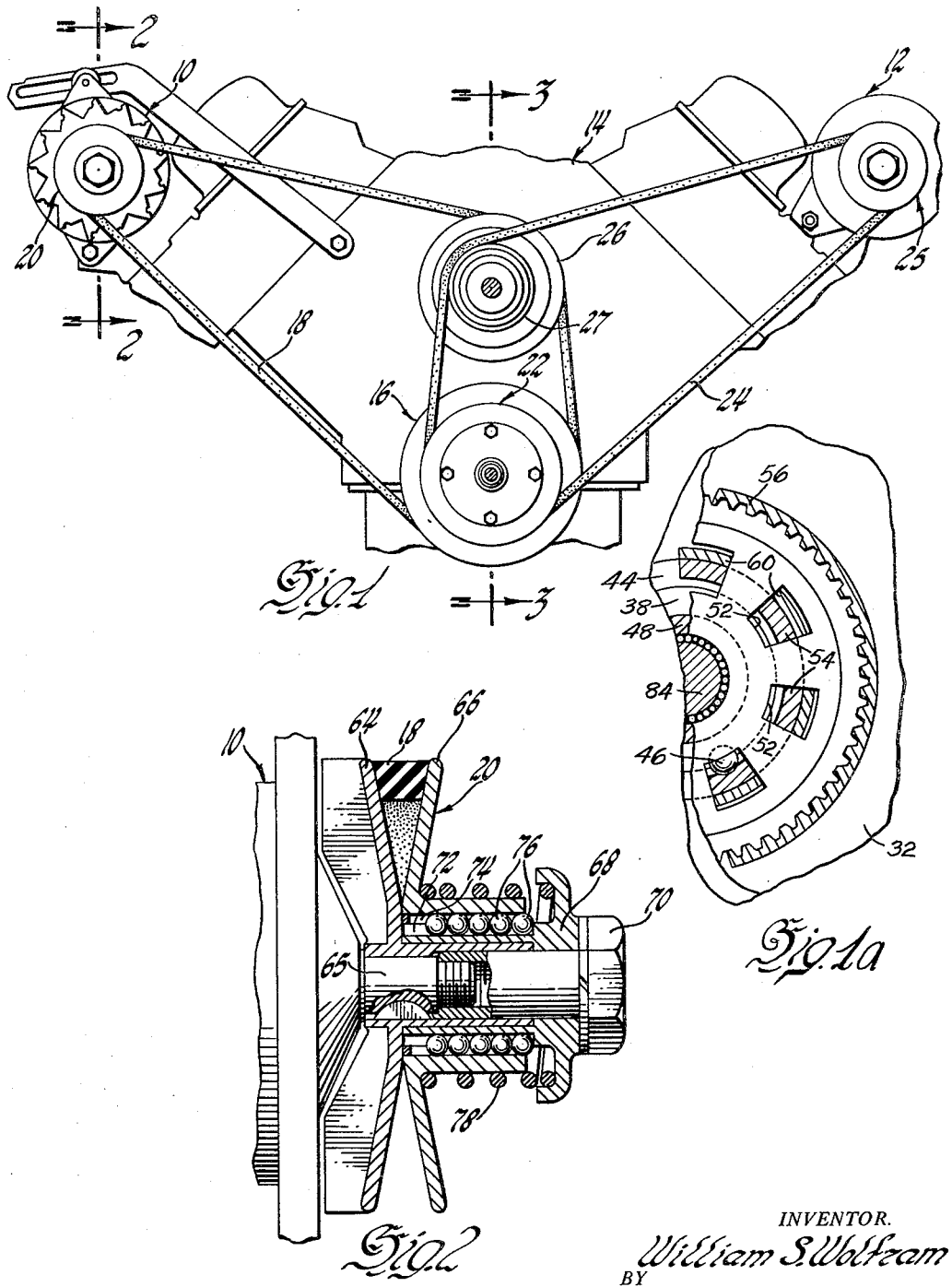
INVENTOR.
William S. Wolfram
BY
W. C. Middleton
ATTORNEY Aug. 7, 1962 W. S. WOLFRAM 3,048,056
DRIVE SYSTEM
Filed April 10, 1958 3 Sheets-Sheet 2

INVENTOR.
William S. Wolfram
BY
W. C. Middleton
ATTORNEY

Aug. 7, 1962 W. S. WOLFRAM 3,048,056
DRIVE SYSTEM
Filed April 10, 1958 3 Sheets-Sheet 3

INVENTOR.
William S. Wolfram
BY
W.C. Middleton
ATTORNEY

3,048,056
DRIVE SYSTEM
William S. Wolfram, Birmingham, Mich., assignor to General Motors Corporation, Detroit, Mich., a corporation of Delaware
Filed Apr. 10, 1958, Ser. No. 727,674
20 Claims. (Cl. 74—665)

This invention relates to drive systems and particularly to variable speed drive systems adapted, although not exclusively, for driving vehicle accessories.

Vehicle accessories, such as fans, pumps, generators, compressors, and the like, when driven by and at the speed of the engine, are subject to a wide variation in engine speed extending over a relatively large range between idle and top speeds. Since, in general, each of the accessories is designed to operate most efficiently at some optimum speed, at low engine speeds the accessory is somewhat ineffective while at high engine speeds noise and wear become factors as well as the possibility of permanent damage to the accessory. Therefore, it is a difficult problem to drive each accessory at approximately the optimum speed, especially with such a large engine speed range. Moreover, any ratio changes afforded must be relatively imperceptible to the driver.

With the foregoing in mind, the invention provides a variable speed drive that changes speed ratios smoothly and gradually without any interruptions in the drive, that provides accurate speed regulation, that is simplified structurally, and that is effective in operation.

Another objective of the invention is to afford a drive system into which a resistance torque is induced in opposition to input torque for effecting speed control. Specifically, a control device induces the resistance torque into the system through the employment of a torque responsive element which, in turn, causes the drive ratios to be varied.

According to the invention, a control device for the aforementioned purpose, utilizes a brake together with a clutch for controlling the energization of a screw. By engaging and disengaging the clutch, the connection between the screw and the brake is altered, thus changing the energization of the screw and accordingly the drive ratios.

By the invention, the various drive transferring mechanisms, such as pulleys, either of the fixed or the expansible and contractible type, and gearing, are operated by a control device of the foregoing character, thereby affording variable drive ratios.

In carrying out the invention, various drive transfer mechanisms are operated by a novel control device so as to produce selected drive ratios. The control device comprises a centrifugally operated clutch and a brake, which together control a screw. The screw is shiftable relative to and driven by an input connected member so that with the centrifugally operated clutch engaged the screw will be revolved by the resultant resistance relative to the input connected member and assume a first position in which one drive ratio is established through the transfer mechanism. When the centrifugally operated clutch disengages at some predetermined input speed, the resistance on the screw is removed and the screw will therefore be moved to a second position by an appropriate force, e.g., the bias from a spring, and another drive ratio will be established.

The drive transfer mechanism may be in the form of expansible and contractible pulleys which are shifted by the screw between expanded and contracted positions. In another form, the pulleys may be fixed and drive transferred thereto by clutches operated by the control device screw. Also planetary gearing may be utilized with the ratios therethrough altered by clutches and brakes, likewise controlled by the control device screw.

The foregoing and other objects and advantages of the invention will be apparent from the following description and from the accompanying drawings, in which:

FIGURE 1 is a front view of a vehicle accessory drive embodying the principles of the invention;

FIGURE 1a is a fragmentary sectional view of the drive taken along line 1a—1a of FIGURE 3;

FIGURE 2 is a sectional view of one of the driven pulleys taken along line 2—2 of FIGURE 1;

Figure 3:
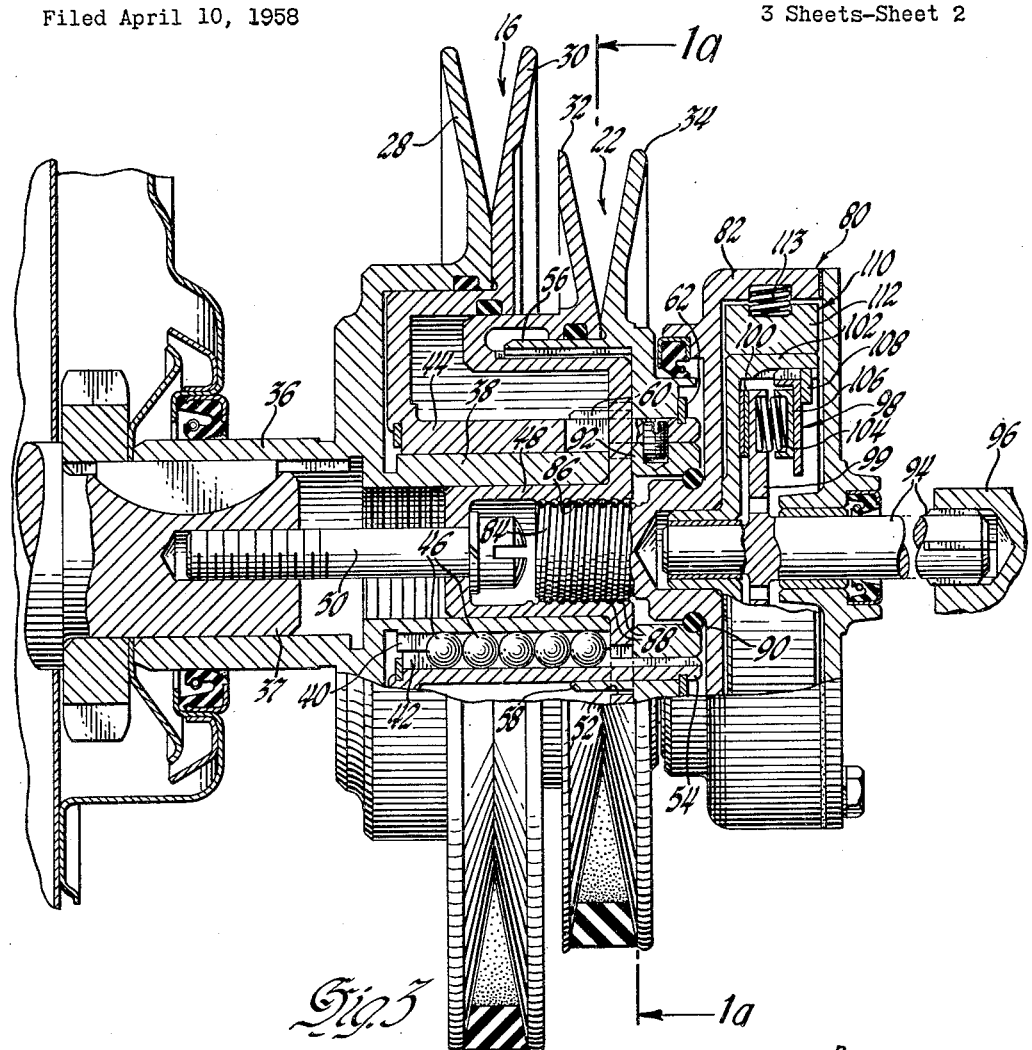
FIGURE 3 is a sectional view of one form of the accessory drive taken along line 3—3 of FIGURE 1.

Referring to the drawings and particularly FIGURE 1, one form of a variable speed drive is illustrated driving various vehicle accessories, such as a generator 10 and a refrigeration compressor 12 from a vehicle engine, denoted generally at 14. A driving pulley 16 is connected by a belt 18 to the generator driven pulley 20, while a driving pulley 22 is connected by a belt 24 to the compressor driven pulley 25. Belts 18 and 24 extend, respectively, around idler pulleys 26 and 27, one of which may be utilized to drive a conventional cooling fan for the engine 14.

As best shown in FIGURE 3, the driving pulleys 16 and 22 are of the expansible and contractible type, the driving pulley 16 having a fixed pulley member 28 and a movable pulley member 30, while the driving pulley 22 has a fixed pulley member 32 and a movable pulley member 34. The hub of the fixed pulley member 28 is formed with a rearward extension 36, which is keyed or otherwise secured to the end of the engine crankshaft 37, and a forward extension 38 provided with external raceways 40. Raceways 40 are aligned with opposite raceways 42 in a hub 44 of the movable pulley member 30 and together these raceways receive a series of balls 46. The balls 46 permit relative axial movement with a minimum of frictional resistance, but prevent relative rotational movement between the connected parts, as will be seen. The fixed pulley member 32 for driving pulley 22 has a cup-like hub 48 fitted within and abutting the end of the forward hub extension 38 and is maintained along with fixed member 28 longitudinally fixed in place by a bolt 50. The hub flange of the fixed pulley member 32 is provided with a series of spaced openings 52 through which extend correspondingly spaced teeth 54 on the end of the hub 44. The movable pulley member 34 of driving pulley 22 has a hub 56 journaled on a mating part of the fixed pulley member 32 and a hub 58 concentric with hub 56, formed with teeth 60 which, as teeth 54, extend through the openings 52. The openings 52 permit movable pulley members 30 and 34 to be shifted with respect to their associated fixed pulley members, and prevent relative rotational movement therebetween. The expansion of the pulleys 16 and 22 is limited by a snap ring 62 and by the depth of the teeth 54.

In FIGURE 2, the driven generator pulley structure 20 is demonstrated, which may be the same for the compressor pulley 25. The pulley 20 comprises a fixed pulley member 64 keyed or otherwise attached to the generator drive shaft 65 and a movable pulley member 66. A sleeve 68 is joined to the hub of the fixed pulley member 64 and positioned axially along with the pulley 20 by a bolt 70 threadedly engaged with the end of the generator shaft 65. External raceways 72 in the sleeve 68 combine with internal raceways 74 in the hub of the movable pulley member 66 to receive a series of balls 76 that function similarly to the balls 46, previously mentioned, in permitting relatively frictionless axial movement of the movable pulley member 66 relative to the fixed pulley member 64, while still transmitting drive therebetween. A spring 78 interposed between an end of the sleeve 68 and the movable pulley member 66 urges this pulley member 66 to the contracted position illustrated in which the belt 18 is moved outwardly to a greater operating pitch diameter and in the absence of any opposing force on the driving pulley 16 will cause it to expand, the resultant ratio being reduced. In other words, with the driving pulley 16 expanded and the driven pulley 20 contracted, the speed at which the generator pulley 20 is driven will be less than when the driving pulley 16 is contracted and the driven pulley 20 expanded, assuming input speed is the same in each instance.

For shifting the movable pulley members 30 and 34, a control device, shown generally at 80 is utilized. The control device has a housing 82, the front end of which is provided with an external screw 84 which coacts with an internal screw 86 in hub 48 of fixed pulley member 32 through the medium of balls 88. The helices of the screws 84 and 86 is such that with the crankshaft 37 revolving and with rotation of the screw 84 therewith being resisted, screw 84 will travel to the left. Then, through a ring 90 and a sleeve 92 attached to the end of the hub 44 of movable pulley member 30, both movable pulley members 30 and 34 will be shifted to the depicted contracted position, this being permitted by the arrangement of opening 52 and balls 46. Balls 88 are also employed to reduce friction for easy operation and are prevented in any suitable manner from escaping from the confining threads at the ends of screws 84 and 86. The housing 82 is supported on a ground shaft 94 which is prevented from rotation through an appropriate socket or splined connection with an engine connected member 96. The socket or splined connection is provided so as to permit axial movement of the ground shaft 94 with respect to the engine connected member 96.

The resistance to rotation of the screw 84 is afforded by a ground brake, shown generally at 98, formed between a flange 99 on the ground shaft 94 to which brake material 100 may be attached and an intermediate drum-like member 102 journaled on the end of the ground shaft 94. The ground brake 98 is urged to the engaged position viewed by a series of springs 104 supported by cups 106 and retained in the preloaded position by a snap ring 108. The connection between the intermediate member 102 and the housing 82 is made through a centrifugally operated clutch 110 which employs a series of spaced shoes 112 of predetermined weight biased radially inwardly by springs 113 to engage the peripheral surface of the intermediate member 102. The springs 113, in addition to providing an inward bias on the shoes 112, transfer drive between the housing 82 and the shoes 112. This drive aspect is assisted by enclosing both ends of the springs 113 within appropriate pockets in the shoes 112 and the housing 82.

In operation, with the crankshaft 37 revolving slowly, the centrifugally operated clutch 110 and the ground brake 98 will both be engaged affording a predetermined resistance torque on the screw 84 which, as mentioned, will cause the pulleys 16 and 22 to be contracted and the driven pulleys, as generator pulley 20 and compressor pulley 25, to be expanded against the force of the spring 78. With both the clutch 110 and the brake 98 engaged, the frictional engagement between the shoes 112 and the peripheral surface of the intermediate member 102 will initially cause the housing 82 and the intermediate member 102 to revolve with the crankshaft 37, whereas the brake 98 will produce the drag or the resistance force at the engaging surfaces of the intermediate member 102 and the brake material 100. This resistance force is continuous and will, in opposing rotation of the screw 84 with the screw 86 being driven at the speed of the crankshaft 37, detract from input torque. In actual operation, however, the resistance torque may amount to only a half of a foot-pound, a somewhat negligible amount.

As the crankshaft speed increases centrifugal force acting on the shoes 112 increases until at some selected speed, e.g., 2000 r.p.m., centrifugal force will be great enough to overcome the bias from the springs 113 and cause the shoes 112 to disengage from the intermediate member 102. With the centrifugal clutch 110 disengaged, the resistance torque is removed from the screw 84 and the spring 78 in the driven pulleys 20 and 25 will force the pulleys 16 and 22 to shift to the expanded position.

With the FIGURE 3 arrangement the accessories are preferably overdriven at low engine speeds so as to approach or be close to the desired optimum operating speed. At the desired engine speed, a ratio change occurs reducing accessory speed thereby insuring against damage from overspeeding as well as decreasing wear.

Figure 4:
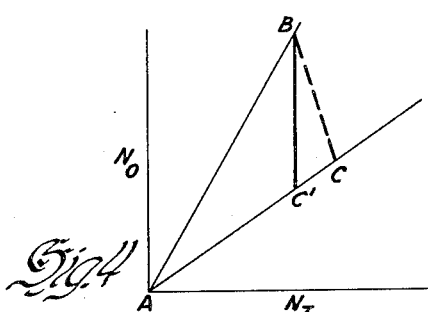
FIGURE 4 is a graph demonstrating the relationship between the input and output speeds of the drive system.

In conjunction with the FIGURE 3 embodiment, FIGURE 4 illustrates graphically the relationship between input and output speeds of the drive. The ordinate of the graph is denoted $N_O$, representing the speed of the output, and the abscissa labeled $N_I$, indicating input or engine speed.

Initially, the relationship between the input and output speeds provides a curve A—B, which by way of example, may be a 1 to 2 ratio, i.e., with the input making one revolution the output will revolve twice. At point B the speed is great enough to disengage the centrifugal clutch 110, whereupon a gradual change in speed will occur, illustrated by the dashed line B—C, and the ratio between the input and output speeds will be that represented by line A—C, which could be a 1 to 1 ratio or a direct drive. An abrupt speed change would be represented by line B—C' and therefore the distance C'—C determines the degree of smoothness for the transition.

Figure 5:
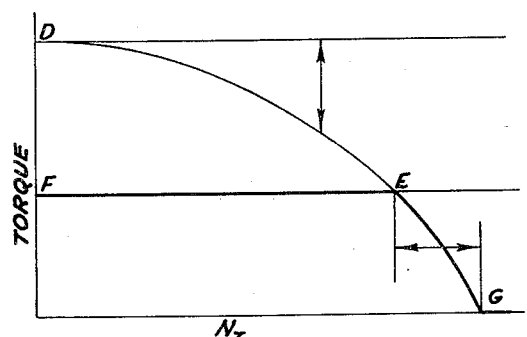
FIGURE 5 is a graph demonstrating the relationship between input speed and resistance torque.

The FIGURE 5 graph further demonstrates the operation of the FIGURE 3 drive and has the ordinate representing the resistance torque and the abscissa input speed. As input speed increases, the effect of the springs 113 is gradually being reduced along curve D—E in a well known manner until the point E is reached at which the centrifugal clutch 110 commences slipping. During this time the resistance torque has been fixed along line F—E at, e.g., a half of a foot-pound. With a further increase in input speed, slippage of the centrifugal clutch 110 will continue and the resistance torque will decrease gradually along curve E—G until at point G the clutch 110 is entirely disengaged and the resistance torque is eliminated.

The FIGURE 5 curve E—G and the FIGURE 4 line B—C both demonstrate the gradual transition which the drive affords from one speed ratio to another. Of course, this transition can be varied to suit the particular installation.

Figure 6:
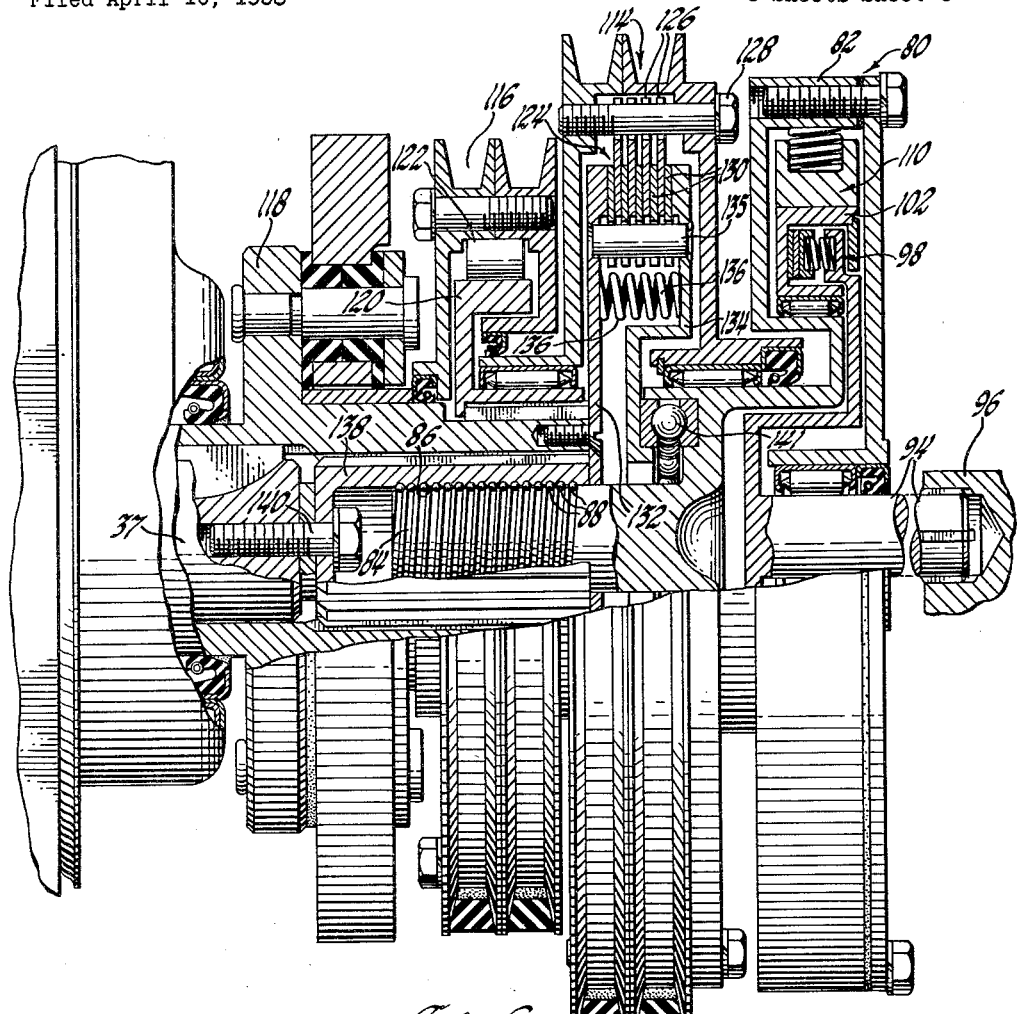
FIGURE 6 is a sectional view, similar to FIGURE 3, of a modified drive system.

In FIGURE 6, a modification of the FIGURE 3 drive is illustrated in which high and low speed fixed driving pulleys 114 and 116 are employed. These pulleys may drive through the dual belts illustrated or a single belt, if desired, high and low speed driven pulleys (not shown) being mounted on each accessory.

A drive hub 118 is attached at one end to the crankshaft 37 and at the opposite end is splined to an inner race 120 for a one-way device, designated generally at 122, the pulley 116 constituting the outer race. The one-way device 122 is of any known construction utilizing sprags, rollers, or the like, to prevent relative rotation between two parts in one direction and allow such in an opposite direction. With certain existing conditions, to be explained, device 122 will transfer drive from the crankshaft 37 to the driving pulley 116.

The driving pulley 114 is connected to the crankshaft 37 by a drive clutch 124 of a multi-disk character having a series of driven plates 126 slidably connected to a bolt 128 and interengaging with a series of driving clutch plates 130. The clutch plates 126 and 130 are interposed between a pressure plate 132 attached to the drive hub 118 and an axially shiftable clutch engaging plate 134. A series of guide pins 135 have one end attached to the clutch engaging plate 134 and the opposite end slidable in an opening in the pressure plate 132. These pins 135 function not only as a support for engaging plate 134 but also to drive connect the driving plates 130 to the pressure plate 132. A series of springs 136 are provided for urging the drive clutch 124 to the disengaged position.

For engaging and disengaging the drive clutch 124, the same control device 80, described above in connection with FIGURE 3, is employed. In this modification the screw 84 coacts through balls 88 with corresponding screw threads 86 in a sleeve 138 attached to the crankshaft 37 by a bolt 140 so as to be revolvable therewith. Therefore, at low engine speeds the ground brake 98 and the centrifugally operated clutch 110, both being engaged, will cause the screw 84 to shift the housing 82 to the left. This, in turn, will, through a thrust bearing 141, force the clutch engaging plate 134 likewise to the left against the opposing bias from the springs 136 compressing clutch plates 126 and 130 so as to engage clutch 124. Due to the relative sizes selected for the driving pulleys 114 and 116 and the pulleys being driven thereby, the pulley 116 will be revolving faster than the crankshaft 37 and the one-way device 122 will be released or freewheeling. At the selected engine speed, the centrifugal clutch 110 will disengage and the resistance torque from the screw 84 will be removed from the drive train. The springs 136 then become effective to cause the screw 84 to shift to the right and carry therewith the housing 82, whereupon the drive clutch 124 will disengage, interrupting the drive from the crankshaft 37 to the driving pulley 114. The release of the drive through the high speed driving pulley 114 will render the low speed driving pulley 116 operative since it will slow down until the one-way device 122 locks and becomes effective to transfer drive from the crankshaft 37 thereto.

Figure 7:
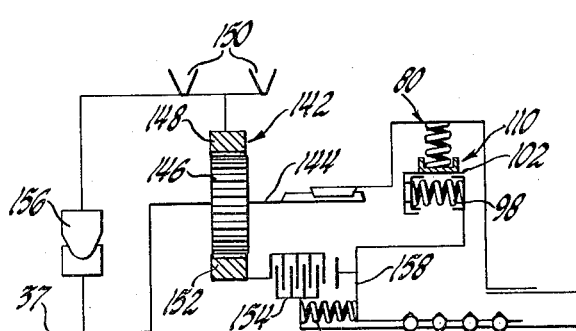
FIGURE 7 is a schematic illustration of another modified drive system.

Another modification of the variable speed drive is shown schematically in FIGURE 7 in which planetary gearing 142 is employed. Gearing 142 includes a planet carrier 144 connected to the crankshaft 37 and on which are journaled a series of planet pinions 146. The planet pinions 146 intermesh with a ring gear 148 drive connected to a dual pulley 150 and a reaction sun gear 152 arranged to be held against rotation by a reaction brake 154 connected to the ground shaft 94'. A one-way device 156, similar to one-way device 122 in the FIGURE 6 modification, is interposed between the carrier 144 and the ring gear 148 so that when effective relative rotation therebetween is prevented and a direct drive through the gearset 142 is thereby provided. The carrier 144 is connected to the housing 82 for the control device 80, similar to the control devices in the previous embodiments described with reference to FIGURES 3 and 6.

The operation of the FIGURE 7 arrangement is such that at low engine speeds the centrifugally operated clutch 110 and the ground brake 98 are engaged causing the screw 84' to shift the brake engaging member 158 to the left against the bias from a spring 160 until the reaction brake 154 is engaged preventing rotation of the reaction sun gear 152. With the carrier connected to the crankshaft 37, the output ring gear 148 and as a result the dual pulley 150 will be overdriven, this being permitted by the one-way device 156. As in the previously described embodiments, the connection of the carrier 144 to the housing 82 will induce a resistance torque into the system until the predetermined control speed is attained, at which time the centrifugally operated clutch 110 will disengage, releasing this resistance, and the spring 160 will urge the screw 84' to the right disengaging reaction brake 154. The one-way device 156 now becomes effective to lock up the gearset 142 for direct drive.

From the foregoing, it will be seen that by each of the drive systems the accessories can be driven at an overspeed ratio at low engine speeds and a lesser speed ratio at high engine speeds to obtain optimum performance of the vehicle accessories. The transition from the higher to lower speed ratios takes place gradually and smoothly at the proper speed which is determined by an induced external force rather than by internal forces, the errors in which tend to accumulate and produce faulty speed regulation.

The invention is to be limited only by the following claims.

I claim:

1. In a drive system, the combination of drive transferring means operative to transmit torque for overcoming a load at a plurality of drive ratios, a source of resistance torque separate from the load and also separate from the drive transferring means, and speed responsive means for controlling the introduction of the resistance torque into the drive system in opposition to the transmitted torque so as to cause the drive transferring means to be conditioned for the different drive ratios.

2. In a drive system, the combination of drive transferring mean for transmitting torque for overcoming a load, torque responsive means for so conditioning the drive transferring means as to provide a plurality of drive ratios therethrough, a source of resistance torque separate from the load and also separate from the drive transferring means, and control speed responsive means arranged to cooperate with the torque responsive mean to introduce into and withdraw from the system the resistance torque thereby establishing the different drive ratios.

3. In a drive system, the combination of drive transferring mean for transmitting torque for overcoming a load, torque responsive means for so conditioning the drive transferring means as to provide a plurality of drive ratios therethrough, a source of resistance torque separate from the load and also separate from the drive transferring means and control means responsive to different ranges of speed, the control means being operative in one of the ranges of speed to connect the torque responsive means to the source of resistance torque to introduce the resistance torque into the system in opposition to the transmitted torque so as to establish one drive ratio and in another of the ranges of speed to withdraw the resistance torque and establish another drive ratio.

4. In a drive system, the combination of drive transferring means, torque responsive means for so conditioning the drive transferring means as to provide a plurality of drive ratios therethrough, brake means, and clutch means operative to connect the torque responsive means to the brake means and induce variable resistance torques into the system in opposition to and separate from the torque transmitted by the drive transferring means thereby establishing different drive ratios.

5. In a drive system, the combination of drive transferring means, torque responsive means for so conditioning the drive transferring means as to provide a plurality of drive ratios therethrough, brake means, and centrifugally operated clutch means engageable in one speed range and disengageable by centrifugal force in another speed range to respectively connect and disconnect the torque responsive means and the brake means, the clutch means when engaged causing the torque responsive means to induce a resistance torque into the system in opposition to the transmitted torque thereby establishing one drive ratio and when disengaged withdrawing the resistance torque to establish another drive ratio.

6. In a drive system, the combination of drive transferring means, screw means for so conditioning the drive transferring means as to provide a plurality of drive ratios therethrough, brake means, and centrifugally operated clutch means engageable in a low speed range and disengageable by centrifugal force in a high speed range to respectively connect and disconnect the screw means and the brake means, the clutch means when engaged causing the screw means to induce a predetermined resistance torque into the system in opposition to the transmitted torque thereby establishing one drive ratio and when disengaged withdrawing the resistance torque to establish another drive ratio.

7. In a drive system, the combination of drive transferring means, ball and screw means for so conditioning the drive transferring means as to provide high and low speed drives therethrough, brake means, and centrifugally operated clutch means engageable in a low speed range and disengageable by centrifugal force in a high speed range to respectively connect and disconnect the ball and screw means and the brake means, the clutch means when engaged causing the ball and screw means to induce a predetermined resistance torque into the system in opposition to the transmitted torque thereby establishing the high speed drive and when disengaged withdrawing the resistance torque to establish the low speed drive train.

8. In a drive system, the combination of an input, an output, drive transferring means interposed between the input and output, an axially fixed element revolvable with the input, a shiftable torque responsive element, bias means exerting a bias force on the torque responsive element, the elements having complementary mating helical grooves therein so as to transfer drive therebetween, means resisting rotation of the torque responsive element with the axially fixed element so as to shift the torque responsive element axially against the bias force from the bias means and thereby introduce a resistance torque into the system in opposition to and separate from the drive transferred by the drive transferring means, and speed responsive means controlling the rotation resisting means so as to condition the drive transferring means for different drive ratios.

9. In a drive system, the combination of an input, an output, drive transferring means interposed between the input and output, an axially fixed element revolvable with the input, a torque responsive element, the elements having complementary juxtaposed helical grooves therein, roller members positioned within the juxtaposed helical grooves so as to transfer drive therebetween, bias means, a ground member prevented from rotation, an intermediate member, a brake between the ground and intermediate members for resisting rotation of the intermediate member, a centrifugally operated clutch interposed between the torque responsive element and the intermediate member, the centrifugally operated clutch being engageable to cause the brake to resist rotation of the torque responsive element with the fixed element thereby shifting the torque responsive element axially to a first position in which the drive transferring means is conditioned for one drive ratio and being disengageable by centrifugal force to disconnect the torque responsive element from the brake so as to allow the torque responsive element to be shifted axially by the bias means to a second position in which the drive transferring means is conditioned for a different drive ratio.

10. In a transmission, an input, an expansible and contractible output pulley, means for contracting the pulley, bias means for expanding the pulley, brake means, and clutch means engageable to connect the pulley contracting means to the brake means so as to contract the pulley, the clutch means being disengageable to disconnect the brake means from the pulley contracting means so as to allow the bias means to expand the pulley.

11. In a drive system, the combination of an input, an output pulley having expanded and contracted positions, screw means revolvable with the input and shiftable for expanding and contracting a pulley, bias means for assisting the screw means to shift in one direction, brake means, and centrifugally operated clutch means engageable to connect the screw means to the brake means so as to resist rotation of the screw means by the input and thereby cause the screw means to be shifted to establish one of the position for the pulley, the clutch means being disengageable by centrifugal force to disconnect the brake means from the screw means so as to allow the bias means to shift the screw means to establish the other of the positions for the pulley.

12. In a drive system, the combination of an input, an expansible and contractible output pulley, an axially fixed element revolvable with the input, a shiftable torque responsive element, the elements each having complementary juxtaposed helical grooves therein, roller members positioned in the helical grooves so as to transfer drive therebetween, bias means, a ground member prevented from rotation, an intermediate member, a brake between the ground and intermediate members for resisting rotation of the intermediate member, and a centrifugally operated clutch interposed between the torque responsive element and the intermediate member, the centrifugally operated clutch being engageable to cause the brake to resist rotation of the torque responsive element with the axially fixed element thereby shifting the torque responsive element axially to a first position in which the pulley is contracted and being disengageable by centrifugal force to disconnect the torque responsive element from the brake so as to allow the torque responsive element to be shifted axially by the bias means to a second position in which the pulley is expanded.

13. In a drive system, the combination of plural drive trains, a plurality of clutches operative to establish different ones of the plural drive trains so as to afford variable drive ratios for the system, screw means revolvable with the input for controlling the clutches, brake means, and centrifugally operated clutch means engageable to connect the screw means to the brake means so as to resist rotation of the screw means and thereby cause one of the plurality of clutches to establish one drive train, the clutch means being disengageable to disconnect the brake means from the screw means so as to cause another of the plurality of clutches to establish another drive train.

14. In a drive system, the combination of an input, a pair of outputs each arranged to afford a different drive ratio, a drive clutch having engaged and disengaged positions in which one of the outputs is respectively connected with and disconnected from the input, a one-way device for connecting the other of the outputs to the input when the drive clutch is disengaged and arranged to release when the drive clutch is engaged, screw means revolvable with the input for operating the drive clutch, biasing means for urging the drive clutch to the disengaged position, centrifugally operated clutch means engageable to connect the screw means to the brake means to resist rotation of the screw means with the input and thereby cause the screw means to be shifted to a first position in which the drive clutch is engaged, the clutch means being disengageable by centrifugal force to disconnect the brake means from the screw means so as to allow the biasing means to shift the screw means to a second position in which the drive clutch is disengaged.

15. In a drive system, the combination of an input, a pair of output pulleys for providing different drive ratios, a drive clutch having engaged and disengaged positions in which one of the output pulleys is respectively connected with and disconnected from the input, a one-way device for connecting the other of the output pulleys to the input when the drive clutch is disengaged and arranged to release when the drive clutch is engaged, bias means for urging the drive clutch to the disengaged position, an axially fixed element revolvable with the input, a torque responsive element, the elements each having complementary juxtaposed helical grooves therein, roller members positioned within the helical grooves so as to transfer drive therebetween, a ground member prevented from rotation, an intermediate member, a brake between the ground and intermediate members for resisting rotation of the intermediate member, and a centrifugally operated clutch interposed between the torque responsive element and the intermediate element, the centrifugally operated clutch being engageable to cause the brake to resist rotation of the torque responsive element with the axially fixed element thereby shifting the torque responsive element axially to a first position in which the drive clutch is engaged, the centrifugally operated clutch being disengageable by centrifugal force to disconnect the torque responsive element from the brake so as to allow the torque responsive element to be shifted axially by the bias means to a second position in which the drive clutch is disengaged.

16. In a drive system, the combination of gearing, ratio changing mechanisms for so conditioning the gearing as to provide a plurality of drive ratios, screw means arranged to render the ratio changing mechanisms operative so that in a first position one ratio changing mechanism is operative to establish one drive ratio through the gearing and in a second position another ratio changing mechanism is operative to establish another drive ratio through the gearing, bias means for urging the screw means from the first position to the second position, brake means, and centrifugally operated clutch means engageable to connect the screw means to the brake means so as to resist rotation of the screw means and thereby cause the screw means to be shifted to the first position, the clutch means being disengageable to disconnect the brake means from the screw means so as to allow the bias means to shift the screw means to the second position.

17. In a drive system, the combination of an input and an output, planetary gearing interposed between the input and output, the gearing including a driving element connected to the input, a driven element connected to the output, and a reaction element, a reaction brake engageable for preventing rotation of the reaction element so as to cause the gearing to be conditioned for one drive ratio, a one-way device operative when the reaction brake is disengaged to connect two of the elements of the gearing together and establish another drive ratio through the gearing, screw means revolvable with the input for operating the reaction brake, biasing means for causing the screw means to disengage the reaction brake, brake means, and centrifugally operated clutch means engageable to connect the screw means to the brake means to resist rotation of the screw means with the input and thereby cause the screw means to be shifted to a first position in which the reaction brake is engaged, the clutch means being disengageable by centrifugal force to disconnect the brake means from the screw means so as to allow the biasing means to shift the screw means to a second position in which the reaction brake is disengaged.

18. In a drive system, the combination of an input and an output, planetary gearing interposed between the input and output, the gearing including a driving element connected to the input, a driven element connected to the output, and a reaction element, a reaction brake engageable for preventing rotation of the reaction element and thereby cause the gearing to be conditioned for one drive ratio, a one-way device operative when the reaction brake is disengaged to connect two of the elements of the gearing together and establish another drive ratio through the gearing, bias means for disengaging the reaction brake, an axially fixed element revolvable with the input, a torque responsive element in a first position engaging the reaction brake being shiftable to an inoperative position so as to allow the reaction brake to be disengaged, the fixed and torque responsive elements each having complementary juxtaposed helical grooves therein, a series of roller members positioned within the grooves so as to transfer drive therebetween, a ground member prevented from rotation, an intermediate member, a brake between the ground and intermediate members for resisting rotation of the intermediate member, and a centrifugally operated clutch interposed between the torque responsive element and the intermediate member, the centrifugally operated clutch being engageable to cause the brake to resist rotation of the torque responsive element with the axially fixed element thereby shifting the torque responsive element axially to a first position in which the reaction brake is engaged, the centrifugally operated clutch being disengageable by centrifugal force to disconnect the torque responsive element from the brake so as to allow the torque responsive element to be shifted axially by the bias means to a second position in which the reaction brake is disengaged.

19. In a drive system, the combination of expansible and contractible pulley means operative to transmit torque for overcoming a load in a plurality of drive ratios through the system, a source of resistance torque separate from the load, and speed responsive means for controlling the introduction of the resistance torque into the drive system in opposition to the transmitted torque so as to cause the pulley means to be expanded and contracted so as to furnish the different drive ratios.

20. In a drive system, the combination of expansible and contractible pulley means for transmitting torque for overcoming a load, torque responsive means for causing the pulley means to be expanded and contracted so as to provide a plurality of drive ratios through the system, a source of resistance torque separate from the load, and control means responsive to different ranges of speed, the control means being operative in one of the ranges to cause the torque responsive means to induce the resistance torque into the system in opposition to the transmitted torque so as to establish one drive ratio and in another of the ranges of speed to withdraw the resistance torque and establish another drive ratio.

References Cited in the file of this patent

UNITED STATES PATENTS

| | | |
|---|---|---|
| 1,112,345 | Philipson et al. | Sept. 29, 1914 |
| 2,173,661 | Perrine | Sept. 19, 1939 |
| 2,496,937 | Edwards | Feb. 7, 1950 |
| 2,599,216 | Wuetig | June 3, 1952 |
| 2,694,479 | Rainsford | Nov. 16, 1954 |
| 2,701,974 | Miller | Feb. 15, 1955 |
| 2,707,883 | Dodge | May 10, 1955 |
| 2,771,792 | Whitney | Nov. 27, 1956 |
| 2,827,136 | Sorchy | Mar. 18, 1958 |
| 2,852,951 | Miner | Sept. 23, 1958 |
| 2,860,519 | Cavanaugh | Nov. 18, 1958 |